(12) United States Patent
Schutten et al.

(10) Patent No.: US 7,859,870 B1
(45) Date of Patent: Dec. 28, 2010

(54) VOLTAGE CLAMPS FOR ENERGY SNUBBING

(75) Inventors: Michael J. Schutten, Rotterdam, NY (US); Robert L. Steigerwald, Burnt Hills, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 325 days.

(21) Appl. No.: 12/181,420

(22) Filed: Jul. 29, 2008

(51) Int. Cl.
*H02M 7/122* (2006.01)
*H02M 7/5387* (2007.01)

(52) U.S. Cl. .................. 363/56.02; 363/67; 363/132

(58) Field of Classification Search ............. 363/17, 363/24, 39, 40, 56.02, 65, 67, 98, 132
See application file for complete search history.

(56) References Cited

U.S. PATENT DOCUMENTS

| | | | |
|---|---|---|---|
| 4,169,241 A | 9/1979 | Peer et al. | |
| 4,688,165 A | 8/1987 | Pruitt | |
| 4,691,270 A * | 9/1987 | Pruitt | 363/56.05 |
| 4,734,828 A * | 3/1988 | Vargo | 363/22 |
| 4,761,722 A | 8/1988 | Pruitt | |
| 4,864,479 A | 9/1989 | Steigerwald et al. | |
| 4,999,524 A | 3/1991 | Williams et al. | |
| 5,132,889 A | 7/1992 | Hitchcock et al. | |
| 5,218,522 A * | 6/1993 | Phelps et al. | 363/124 |
| 5,414,238 A | 5/1995 | Steigerwald et al. | |
| 5,422,804 A * | 6/1995 | Clark | 363/44 |
| 5,450,307 A * | 9/1995 | Yasumura | 363/47 |
| 5,451,962 A | 9/1995 | Steigerwald | |
| 5,546,294 A | 8/1996 | Schutten et al. | |
| 5,570,276 A | 10/1996 | Cuk et al. | |
| 5,880,949 A | 3/1999 | Melhemet et al. | |
| 5,946,200 A | 8/1999 | Kim et al. | |
| 6,011,708 A | 1/2000 | Doht et al. | |
| 6,310,785 B1 | 10/2001 | Ayyanar et al. | |
| 6,347,045 B1 | 2/2002 | Poon et al. | |
| 6,611,444 B2 | 8/2003 | Ayyanar et al. | |
| 6,693,805 B1 | 2/2004 | Steigerwald et al. | |
| 6,954,367 B2 | 10/2005 | Yang et al. | |

(Continued)

OTHER PUBLICATIONS

Jang et al, "A New ZVS-PWM Full-Bridge Converter," IEEE Transactions on Power Electronics, vol. 18, No. 5, pp. 1122-1129 (Sep. 2003).

(Continued)

*Primary Examiner*—Adolf Berhane
(74) *Attorney, Agent, or Firm*—Duane Morris LLP

(57) ABSTRACT

A power converter generates direct voltage and includes a phase-shifted PWM bridge with first and second controllable switches connected as a half-bridge with a first tap, for generating AC at the first tap. An output transformer includes a primary winding coupled to the first tap. A full-wave rectifier is connected to a secondary winding of the output transformer. A filter is coupled to the full-wave rectifier for producing filtered output direct voltage. Resonances create surges which may undesirably result in energy loss. A second transformer includes a primary winding coupled to receive the resonant surges and a secondary winding at which transformed surges appear. A second rectifier is coupled to the secondary winding of the second transformer, for rectifying the surges. The energy of the surges is returned or coupled to the source or load. In one embodiment, the full-wave rectifier is a bridge rectifier.

16 Claims, 9 Drawing Sheets

U.S. PATENT DOCUMENTS

| | | | |
|---|---|---|---|
| 6,984,964 | B2 | 1/2006 | Chang |
| 7,209,370 | B2 | 4/2007 | Phadke et al. |
| 7,515,446 | B2 | 4/2009 | Lin |
| 7,609,532 | B1 | 10/2009 | Schutten et al. |
| 2002/0034083 | A1 | 3/2002 | Ayyanar et al. |
| 2002/0044461 | A1 | 4/2002 | Jang et al. |
| 2005/0041439 | A1 | 2/2005 | Jang et al. |
| 2007/0133239 | A1* | 6/2007 | Tanaka .................. 363/65 |

OTHER PUBLICATIONS

Jang et al, "A New PWM-ZVS Full-Bridge Converter," Power Electronics Laboratory, Delta Products Corporation, pp. 331-337 (Jun. 2006).

Vlatkovic et al, "Auxillary Series Resonant Converter: a New Converter for High-Voltage, High-Power Applications," Power System Technologies Group, General Electric Corporate Research and Development Center, pp. 493-499 (Jul. 1996).

Hamada et al, "Analysis and Design of a Saturable Reactor Assisted Soft-Switching Full-Bridge DC-DC Converter," IEEE Transactions on Power Electronics, vol. 9, No. 3, pp. 309-317 (May 1994).

Ayyanar et al, "Novel Soft-Switching DC-DC Converter with Full ZVS-Range and Reduced Filter Requirement—Part I: Regulated-Output Applications," IEEE Transactions on Power Electronics, vol. 16, No. 2, pp. 184-192 (Mar. 2001).

Ayyanar et al, "Novel Soft-Switching DC-DC Converter with Full ZVS-Range and Reduced Filter Requirement—Part II: Constant-Input, Variable-Output Applications," IEEE Transactions on Power Electronics, vol. 16, No. 2, pp. 193-200 (Mar. 2001).

Jain et al, "Analysis and Design Considerations of a Load and Line Independent Zero Voltage Switching Full Bridge DC/DC Converter Topology," IEEE Transactions on Power Electronics, vol. 17, No. 5, pp. 649-657 (Sep. 2002).

Hua et al, "An Improved Full-Bridge Zero-Voltage-Switched PWM Converter Using a Saturable Inductor," IEEE Transactions on Power Electronics, vol. 8, No. 4, pp. 530-534 (Oct. 1993).

Xie et al, "A Novel ZVS-PWM Full-Bridge Converter Topology," 35th Annual IEEE Power Electronics Specialists Conference, pp. 1663-1667, Aachen, Germany (2004).

Gao et al, "Integrated Magnetics Scheme for ZVS Hybrid Converter with Improved Performance," 35th Annual IEEE Power Electronics Specialists Conference, pp. 3681-3687, Aachen, Germany (2004).

Moschopoulos et al, "ZVS PWM Full-Bridge Converters With Dual Auxiliary Circuits," Concordia University Dept. of Electrical & Computer Engineering, P.D. Ziogas Laboratory, pp. 574-581 (Apr. 2000).

Moschopoulos et al, "A PWM Full-Bridge Converter With Load Independent Soft-Switching Capability," Concordia University Dept. Of Electrical & Computer Engineering, P.D. Ziogas Laboratory, pp. 79-85 (Mar. 2000).

Wu et al, "Analysis and Optimal Design Considerations for an Improved Full Bridge ZVS DC-DC Converter with High Efficiency," IEEE Transactions on Power Electronics, vol. 21, No. 5, pp. 1225-1234 (Sep. 2006).

Mweene et al, "A 1 kW 500 kHz Front-End Converter for a Distributed Power Supply System," IEEE Transactions on Power Electronics, vol. 6, No. 3, pp. 398-407 (Jul. 1991).

U.S. Appl. No. 11/965,327, entitled "Phase-Shifted Bridge With Auxiliary Circuit to Maintain Zero-Voltage Switching", filed on Jul. 29, 2008 in the names of Michael J. Schutten and Robert L. Steigerwald, inventors.

* cited by examiner

VOLTAGE CLAMPS FOR ENERGY SNUBBING

BACKGROUND OF THE INVENTION

The phase-shifted pulse-width-modulated (PSPWM) resonant bridge has become a mainstay in the dc-to-dc power converter field, because it provides low switching losses by virtue of zero-voltage switching (ZVS) at constant switching frequency. The low switching losses are very desirable, in that they allow the switching frequency to be high without undesirable heating of the switches. The high switching frequencies which ZVS allows in turn allow power converters to be made with physically small reactors such as capacitors and inductors.

FIG. 1 is a simplified schematic diagram of a dc-to-dc switching converter, similar to that described in "a 1 kW 500 kHz Front-End Converter for a Distributed Power Supply System," by Mweene et al, published in the IEEE Transactions on Power Electronics, Vol. 6, No 3, July 1991. In FIG. 1, a first source of direct energizing voltage (or electrical potential) is illustrated by a conventional battery symbol and is designated 12. Direct energizing voltage is often referred to as direct current (dc). The dc voltage of source 12 is designated as an input voltage or Vi. Input voltage V1 is applied as +Ed to a first bus 14 relative to RTN, the second bus 16. A first inverter switching leg is designated A and includes first and second controllable switching devices, illustrated as metal oxide semiconductor field-effect transistors (MOSFETs) Q1 and Q2, respectively. A second inverter switching leg is designated B and includes third and fourth controllable switching devices, illustrated as MOSFETs Q3 and Q4, respectively. The salient characteristics of the controllable switching devices is that each includes a controlled current conduction path, which in the case of a MOSFET is the drain-to-source path, and a control electrode, which is the gate electrode. Thus, MOSFET Q1 is marked with the letters s, d and g to represent the source, drain, and gate electrodes. The other MOSFETs are similarly marked. In FIG. 1, leg A is illustrated as including the "serial" or "series" combination of the drain-to-source current paths of MOSFETs Q1 and Q2. Those skilled in the art will recognize that control of the gates of the MOSFETs should result in lack of simultaneous current flow through both current paths, but for purposes of explanation the "serial" connection as illustrated in FIG. 1 will be understood. Leg A is illustrated as being connected "between" the buses 14 and 16. Those skilled in the art will recognize that the term "between" as used in electrical descriptions differs from the general physical meaning, in that the connection of leg A "between" buses 14 and 16 means that the legs are electrically connected to receive electric energy therefrom, not that they are physically situated between the buses. Similarly, leg B is coupled "between" buses 14 and 16. The term "across" similarly has different meanings in the electrical field than in ordinary use. The connection of the two legs defines a "bridge" circuit designated generally as 11.

In normal operation of a dc-to-dc converter such as that of FIG. 1, square-wave gate control signals are generated, as by a control block 18, and applied to the gates of switches Q1, Q2, Q3, and Q4 with phases selected, generally speaking, to turn ON or render conductive the controlled current paths of diagonally opposite switches of the bridge circuit 11. Thus, for example, switches Q1 and Q4 are rendered conductive while switches Q2 and Q3 are rendered nonconductive, and shortly thereafter switches Q2 and Q3 are rendered conductive while switches Q1 and Q4 are rendered nonconductive. This has the effect of alternately connecting to bus 14 and to bus 16 the A leg "tap point" At, which lies "between" switches Q1 and Q2, while simultaneously connecting to bus 14 and to bus 16, respectively, the B leg tap point Bt. This, in turn, causes tap points At and Bt to alternate, at the switching frequency, between the +Ed bus voltage and the −RTN bus voltage. The alternation of the voltages appearing at tap points At and Bt effectively produces an alternating voltage "between" the tap points.

The alternating voltage appearing between tap points At and Bt in FIG. 1 is applied to the primary winding T1$p$ of a transformer T1. More particularly, tap point At is connected by way of a transformer primary winding connection point or terminal T1$p_1$. Similarly, tap point Bt is connected to a terminal by way of a transformer primary winding connection point or terminal T1$p_2$. As illustrated, an inductance designated Lt is connected between terminals T1$p_1$ and T1$p$. Inductance Lt does not necessarily represent a discrete inductive element, but rather can represent, at least in part, the leakage inductance of transformer T1. Similarly, an inductance Lm is illustrated as being coupled "across" or in parallel with terminals T1$p_1$ and T1$p_2$. Inductance Lm does not necessarily represent a discrete inductive element, but rather can represent, at least in part, the magnetizing inductance of transformer T1.

When an alternating voltage is applied from tap points At and Bt to the primary winding of transformer T1, an alternating voltage is induced or produced across secondary winding T1$s$. The alternating voltage appearing across the output or secondary winding terminals of transformer T1 is applied to a full-wave bridge rectifier designated generally as 30, which produces pulsating direct voltage on a pair of buses 31, 33. The pulsating direct voltage is applied by way of an output filter 35 including an inductor Lo and "across" an output filter capacitor Co. Filter inductor Lo and filter capacitor Co make up a low pass filter, in known fashion, to produce generally ripple-free output direct voltage Vo "between" conductors 36 and 38 for application to a load illustrated as a resistance $R_L$.

The dc-to-dc converter 10 of FIG. 1 thus receives direct voltage from a source 12, converts the direct voltage to alternating voltage in the bridge 11, and converts the alternating voltage to a secondary alternating voltage by way of transformer T1. The magnitude of the secondary alternating voltage is be selected by the primary-to-secondary winding or turns ratio of transformer T1, and the converter duty cycle, as known in the art. The secondary alternating voltage at the secondary winding of transformer T1 is rectified and filtered to produce an output direct voltage Vo. The dc-to-dc converter 10 thus provides, by virtue of galvanic insulation of transformer T1, electrical isolation between the source of direct voltage 12 and the output direct voltage V0. It also allows the output voltage V0 to be different from (either greater than or less than) the source voltage.

Those skilled in the art know that control of the relative phases of the control signals applied to the various controllable switches of dc-to-dc converter 10 of FIG. 1 allows the voltage generated between tap points At and Bt to be varied. This variation as a function of phase is often used as part of a feedback control system for controlling the output direct voltage Vo.

It is desirable to cause the controllable switches of the dc-to-dc converter circuit of FIG. 1 to "soft switch" or to switch from the conductive state to the nonconductive state such that, during the switching transient, high voltage and current are not simultaneously applied to the switching device. Soft switching is described generally in U.S. Pat. No. 4,864,479, issued Sep. 5, 1989 in the name of Steigerwald et al. In the arrangement of FIG. 1, the presence of energy stored in transformer leakage inductance, Lt, tends to promote soft switching as described in the aforementioned Steigerwald et al. patent. Mweene et al. describe switching converter operation as phase-shifted pulse-width modulation (PSPWM), in which either the two upper or two lower controllable switches are left conductive or ON during the free-wheeling period, so that the load and magnetizing currents can continue to flow in the primary winding T1$p$. The Mweene et al. switching operation is described in conjunction with the amplitude-time waveforms of FIGS. 2A, 2B, 2C, 2D, 2E, 2F, and 2H. FIGS. 2A and 2B illustrate the voltages at tap points At and Bt, respectively, of FIG. 1, for approximately a 70% duty ratio or cycle, as periodically taking on the value of +Vin or zero. Some periods exist during which both tap points At and Bt are at the same voltage, both at +Vin or both at zero. FIG. 2C plots the voltage $V_{AB}$ (or $V_{At}$-$V_{Bt}$) "between" nodes or taps At and Bt, which energizes the primary winding of the transformer T1. FIG. 2D plots the pulsating direct voltage Vx, which appears at the rectifier bridge output point X (relative to the negative terminal of output capacitor Co) of FIG. 1 as a result of the application of $V_{AB}$ to the transformer T1. FIG. 2E plots the magnetizing current $I_M$ or $I_{cm}$ of transformer T1. The magnetizing current increases (becomes more positive) substantially linearly during those intervals in which $V_{AB}$ is positive, remains substantially constant when $V_{AB}$ is zero, and decreases (becomes more negative) during those intervals in which $V_{AB}$ takes on a negative value. FIG. 2F plots the primary winding current IP of transformer T1. FIG. 2G plots as a solid line the gate-to-source voltage of controllable switch Q1, and as a dotted line the gate-to-source voltage of controllable switch Q2. FIG. 2H plots as a solid line the gate-to-source voltage of controllable switch Q4, and as a dotted line the gate-to-source voltage of controllable switch Q3.

As described by Mweene et al., zero-voltage switching results from operation in which, if Q1 and Q4 are ON (the controllable current paths are conductive), and then Q1 is turned OFF (controllable current path rendered nonconductive), the load and magnetizing current (referred to the transformer primary and together designated Ip) that had been flowing in through the channel or controllable current path of Q1 commutate to the parasitic capacitance of node or tap At. This capacitance is the parallel combination of output capacitances of MOSFET switches Q1 and Q2, transformer parasitic capacitances, and the reflected junction capacitances of two OFF-state rectifiers, namely rectifiers D2 and D3. The voltage at node At falls as the current Ip discharges the combined capacitance until the capacitance voltage reaches the voltage of the bottom rail or bus 16, at which time the voltage at At is clamped to the bottom rail 16 voltage by the inherent antiparallel diode of switch Q2. This transition is essentially lossless. Switch Q2 can be turned ON losslessly with zero volts across its drain-to-source path, so long as the turn-on of Q2 takes place after the resonant transition that makes the drain-source voltage across Q2 zero volts, so as to avoid disrupting the zero-voltage lossless switching of node At. At the end of the freewheeling interval, switch Q4 is turned OFF, and current flowing in the primary winding T1$p$ commutates to the parasitic capacitances of node Bt. As the voltage across the transformer becomes negative, the secondary-side currents commutate from the diode D1-D4 path to the diode D2-D3 path. For a period of time, all the diodes D1, D2, D3, and D4 are ON, and the voltage across the transformer secondary winding T1$s$ is essentially zero. The voltage at node Bt, and therefore the transformer voltage, appear across the transformer leakage inductance Lt. The leakage inductance is illustrated as being on the primary side for ease of explanation.

As can be seen from the timing diagrams of FIGS. 2A through 2H, all four controllable switches Q1 through Q4 are driven with close to a 50% duty cycle or ratio. The drives for Q1 and Q2 are oppositely-poled square-waves, with sufficient dead time at each transition to permit completion of the lossless ZVS switching transition of node At. Similarly, the drives Q3 and Q4 are also oppositely-poled square-waves with dead times. Control of the duty cycle of the H-bridge 11, the drives for the A and B legs are mutually shifted in time. During those intervals in which the two drives are 180° out-of-phase (meaning that Q4 is ON whenever Q1 is ON), the duty ratio is essentially 100%. When the two drives are in-phase (Q3 is ON whenever Q1 is ON), the duty ratio is zero. Control of the relative drive phase of the legs allows control of the output direct voltage, and the abovementioned feedback control senses the output voltage and compares it with a reference to generate an error signal, which in turn is used to control the output voltage in a degenerative manner.

As described by Mweene et al., a resonance between the magnetizing inductance of the transformer T1 and the node Bt capacitance takes place, and with proper selection of values can achieve peak voltages greater than the applied or bus voltage. When the voltage of the parasitic capacitance at node Bt starts to exceed the applied voltage Vi, the inherent anti-parallel diode of MOSFET Q3 turns ON and clamps the resonant voltage until the leakage inductance current falls below zero. During this clamping interval, switch Q3 can be turned ON losslessly.

Mweene et al. further indicate that the choice of the sum of the magnetizing and load current can affect the loss of the switching transitions. The magnetizing current always has the same value, which depends upon the applied voltage Vi and the amount of phase shift between legs A and B. The load current, however, can vary by large amounts, which can adversely affect the ability to zero-voltage switch (ZVS) at low or zero load currents. Zero-voltage switching is very desirable both to maintain low losses in the power switches and in the inverse-parallel diodes of FETs when used as power switches, and tends to reduce electromagnetic interference (EMI) attributable to the switching of significant currents. The power converter regulates the output voltage. At light load the power converter has a small duty ratio, so the magnetizing current is also small, thus there is not sufficient energy for zero-voltage switching under light load operation. The loss of zero-voltage switching leads to greatly increased switching loss, and a corresponding decrease in power converter efficiency. This loss of zero-voltage switching also is electrically noisy, and leads to EMI difficulties.

Improved or alternative dc-to-dc converters are desired.

SUMMARY OF THE INVENTION

A dc-to-dc power converter according to an aspect of the invention is for generating load voltage. The power converter comprises a switching bridge, which may be a phase-shifted pulse-width-modulated ZVX bridge. The phase-shifted pulse-width-modulated bridge includes at least first and second controllable switches, each controllable switch of which includes a controllable current path and a control input port. The controllable current paths of the first and second controllable switches are connected as a first half-bridge with a first tap, a first connection node adjacent the first controllable switch and remote from the first tap, and a second connection node adjacent the second controllable switch and remote from the first tap. The first connection node is connected to energizing voltage of a first polarity from a first terminal of a source of direct energizing voltage, and the second connection node is connected to energizing voltage of a second polarity from the source of direct energizing voltage. The phase-shifted pulse-width-modulated bridge further includes third and fourth devices, each including a current path, with the current paths of the third and fourth devices being connected as a second half-bridge with a second tap. The second half-bridge is connected to the energizing voltage of a first polarity from a first terminal of the source of direct energizing voltage, and to the energizing voltage of a second polarity from the source of direct energizing voltage. A phase-shift pulse-width-modulated controller is coupled to at least the control input ports of the first and second controllable switches, for switching the controllable switches so that a fixed-frequency alternating voltage appears between the first and second taps of the half-bridges with a duty cycle selected to provide a desired converter load voltage. An output isolation transformer including primary and secondary windings is provided. The primary winding of the output transformer is coupled to the first and second taps, so that the alternating voltage is applied to the primary winding of the output transformer. A full-wave rectifier circuit is connected to the secondary winding of the transformer, for rectifying secondary winding current flowing under the impetus of the alternating voltage. A filter is coupled to the full-wave rectifier for producing output direct voltage for application to a load, whereby resonances between the output rectifier diode capacitances and transformer leakage inductance may generate voltage surges which may undesirably result in energy loss. A second transformer, includes a primary winding coupled to receive the voltage surges and a secondary winding at which energy from the surges are coupled. A second rectifier is coupled to the secondary winding of the second transformer and to one of the load and energizing voltages, for rectifying the surges and making the energy of the surges available to the one of the load and energizing voltages. That is, the energy of the surges is returned or coupled to the source or load. In one embodiment, the full-wave rectifier is a bridge rectifier.

The bridge rectifier may comprise a center tap on the secondary winding of the output transformer together with first and second unidirectional current conductors such as rectifiers or diodes, each coupled to an end of the secondary winding remote from the center tap, and connected to each other. The third and fourth devices may be third and fourth controllable switches, respectively, each including a controllable current path and a control input port, the controllable current paths of the third and fourth controllable switches being connected as the second half-bridge with the second tap, a third connection node adjacent the third controllable switch and remote from the second tap, and a fourth connection node adjacent the fourth controllable switch and remote from the second tap, the third connection node being connected to energizing voltage of the first polarity from the first terminal of the source of direct energizing voltage, and the fourth connection node being connected to energizing voltage of the second polarity from the source of direct energizing voltage. As an alternative, the third and fourth devices may be capacitors.

In another embodiment, the primary winding of the second transformer is connected to the secondary winding of the output transformer, so as to be energized by the voltage appearing across the secondary winding of the output transformer. In this version, the second rectifier is a full-wave rectifier. In yet another version, the primary winding of the second transformer is serially connected between the full-wave rectifier and the load. In this version, the second rectifier is a half-wave rectifier.

DESCRIPTION OF THE INVENTION

Figure 1:
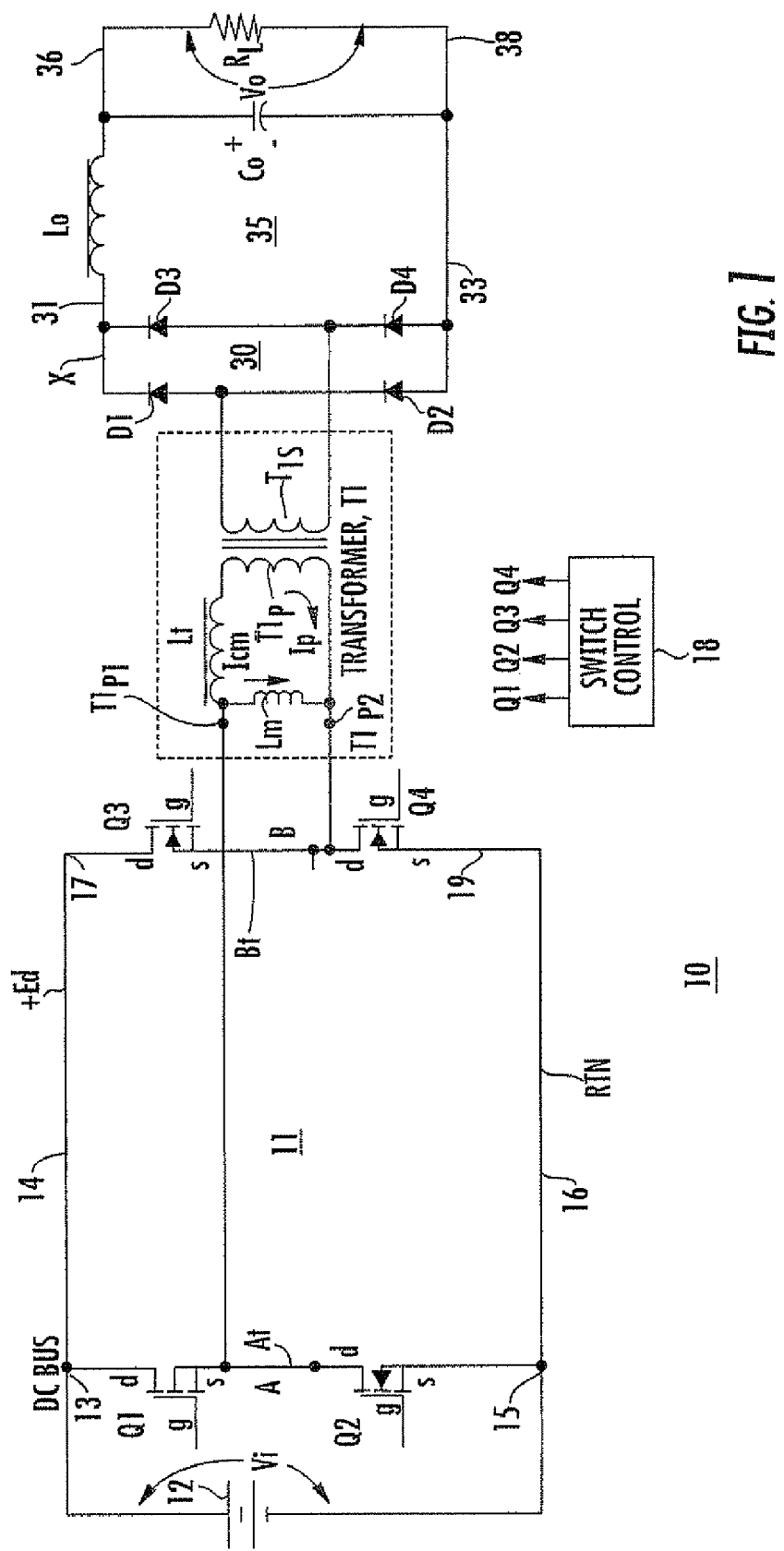
FIG. 1 is a simplified schematic diagram of a prior-art dc-to-dc phase-shifted pulse-width-modulated switching converter including an output transformer.
Figure 2A:
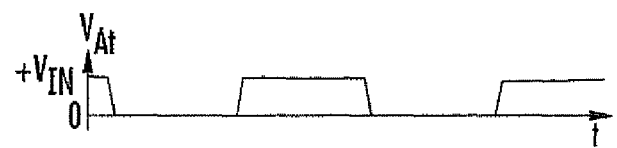
FIGS. 2A, 2B, 2C, 2D, 2E, 2F, 2G, and 2H are plots of voltage or current waveforms which are associated with the converter of FIG. 1.
Figure 2B:
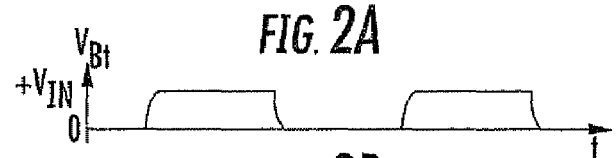
Figure 2C:
Figure 2D:
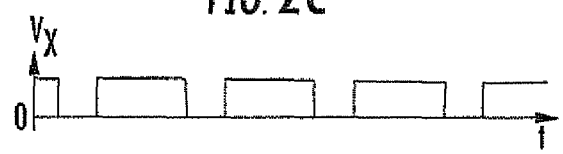
Figure 2E:
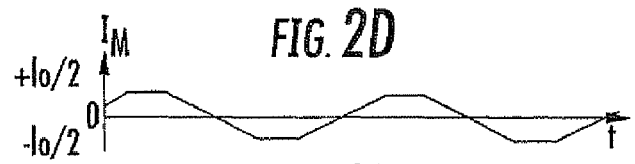
Figure 2F:
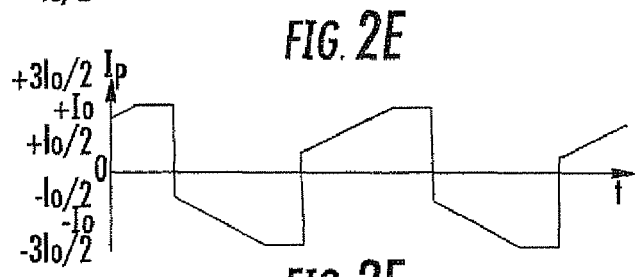
Figure 2G:
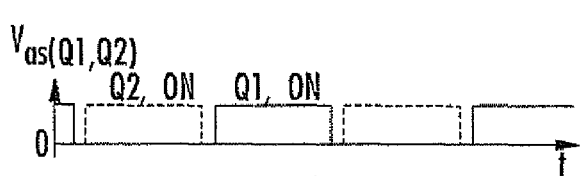
Figure 2H:
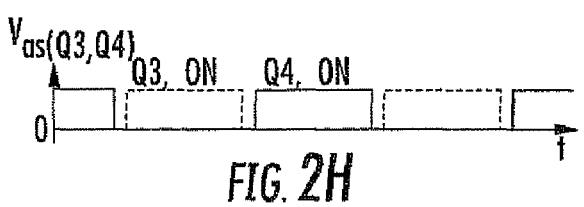
Figure 3:
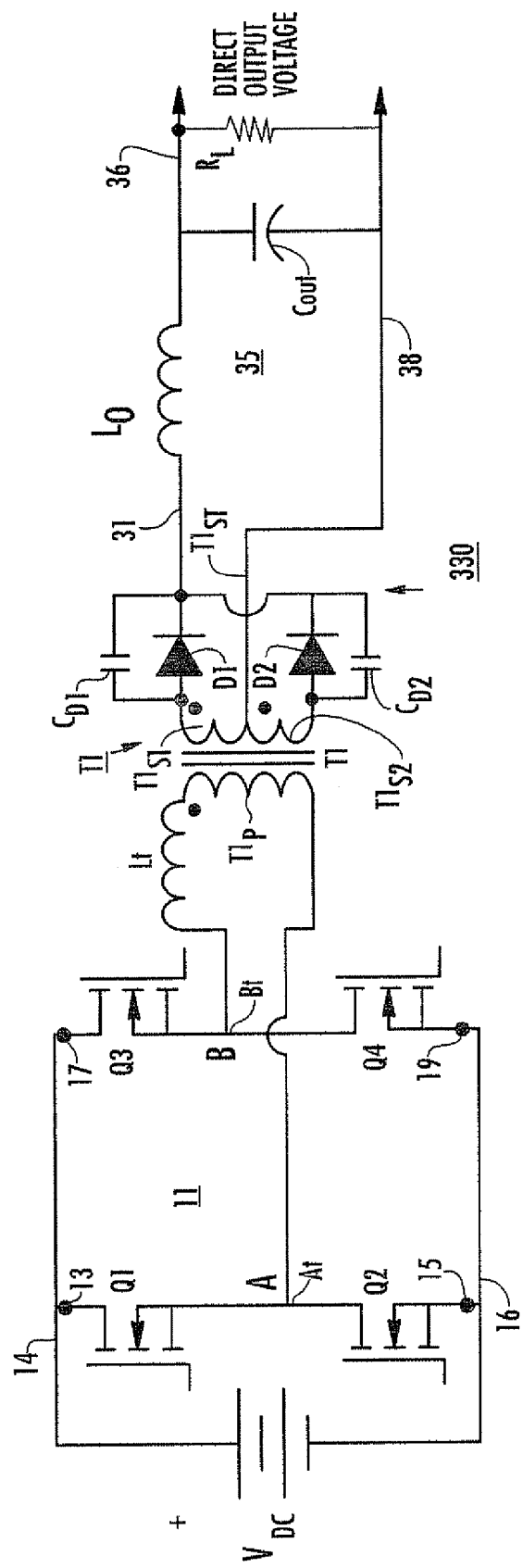
FIG. 3 is a simplified diagram similar to FIG. 1, illustrating a full-bridge arrangement with a switched half-bridge.

FIG. 3 is a simplified representation of the circuit of FIG. 1, illustrating certain additional elements important to consideration or understanding of overall efficiency of dc-to-dc converter. In FIG. 3, the full-wave bridge rectifier 30 of FIG. 1 is replaced for ease of understanding with a full-wave rectifier 330 including a center-tapped transformer T1 secondary winding $T1_s$, but the same principles apply to a full-wave bridge rectifier. In FIG. 3, unidirectional current conducting devices (rectifiers or diodes) D1 and D2 of FIG. 2 have their anodes connected to the two ends of secondary winding $T1_s$, and their cathodes connected together and by way of a conductor 31 to an end of inductor Lo of output filter 35. The diodes exhibit anode-cathode junction capacitance when in the reverse-biased state. The capacitance of diode D1 is illustrated as $C_{D1}$, and the capacitance of diode D2 is illustrated as $C_{D2}$. The rectified pulsating direct current from secondary winding $T1_s$ is applied to conductor 31 relative to center tap conductor 38.

In operation of the arrangement of FIG. 3, and in the absence of the resonance or ringing, the voltage across the capacitance $C_{D1}$ of diode D1 (or equivalently of diode D2) would be simply equal to the step voltage. However, a resonance occurs between the capacitance of a diode and at least some inductances of the circuit, including the (transformed or referred) leakage inductance Lt of transformer T1. This resonance occurs when a voltage step is applied to the series combination of a diode and the inductance. In the presence of ringing, the diode voltage attempts to rise to twice the driving voltage step. This voltage rise stresses the diodes and may decrease their reliability. Also, the energy of the resonance may be lost as heat.

The resonance occurs in response to a switch transition which occurs when current is circulating through either the two upper switches (Q1 and Q3) when in their simultaneously conductive state or the two lower switches (Q2 and Q4) in their simultaneously conductive state. This may be understood by considering a state in which the two upper switches Q1, Q3 are both nonconductive, and lower switches Q2, Q4 are both conductive. Current flows in leakage inductance Lt and in primary winding $T1_p$, and to nodes At and Bt. The current flowing to nodes At and Bt is carried by Q4 carrying "forward" current (that is, through the channel of the MOSFET) and by Q2 carrying reverse current (that is, through the inherent body diode of MOSFET. With switches Q2 and Q4 conductive, primary winding $T1_p$ is short-circuited, and the voltage across secondary winding $T1_s$ is nominally zero. Resonance is started by turn-OFF (rendering nonconductive) of forward-current switch Q4. At the moment of turn-OFF, the voltage at node Bt is driven or rises (becomes more positive) toward the voltage at the rail or bus 14, all under the impetus of the energy stored in Lt. As the voltage at tap Bt rises to the bus 14 voltage, the bus voltage appears across the series combination of Lt and primary winding $T1_p$. That is, a step voltage is applied to the primary winding and leakage inductance, which causes a step voltage "across" secondary winding $T1_s$. The step of voltage is applied from secondary winding $T1_s$ to the anodes of diodes D1 and D2. The secondary winding $T1_s$ of transformer T1 is configured in two portions $T1_{s1}$ and $T1_{s2}$ with a center tap 38, so that oppositely-poled voltages are applied to the diodes D1 and D2. One or the other of diodes D1 and D2 will conduct, and the other will block. The diode that blocks becomes reverse-biased, and its junction capacitance $C_{D1}$ rings or resonates with the transformer T1 leakage inductance Lt. If, for example, diode D1 blocks, the resonance occurs between the leakage (and possibly other) inductance(es). The resonance causes the voltage across the junction capacitance $C_{D1}$ to rise, or at least attempt to rise to twice the bus voltage as referred to the secondary of the transformer. As mentioned, this tends to apply stresses to the diodes, and these stresses recur during each switching cycle, which may affect the reliability of the diodes. The resonant energy is generally lost, which represents an inefficiency. These problems are discussed in the paper "a 1 kW 500 kHz Front-End Converter for a Distributed Power Supply System," by Mweene et al., published in IEEE Transactions on Power Electronics, Vol 6, No 3, July 1991, pp. 398-406.

Figure 4:
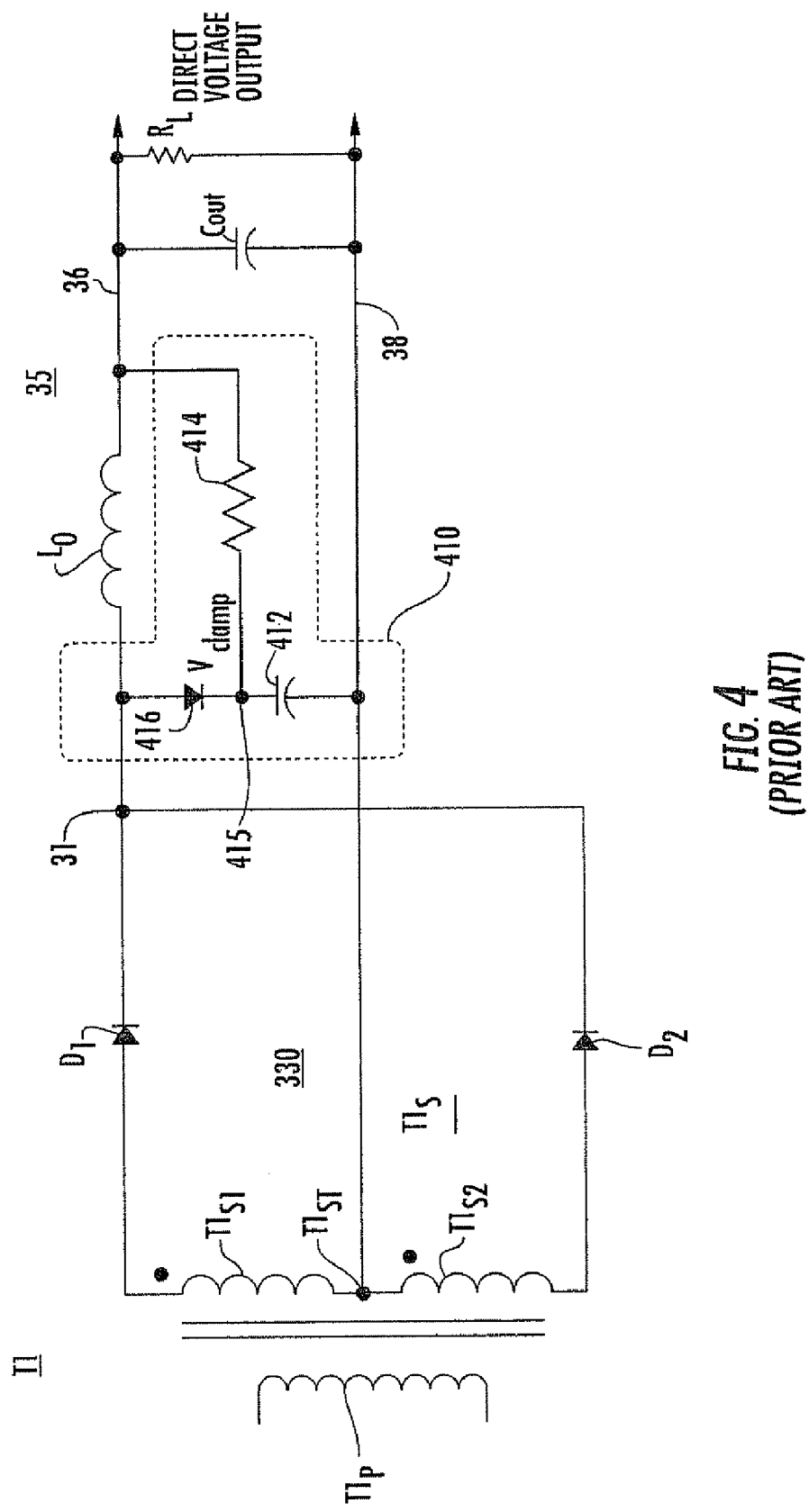
FIG. 4 illustrates an existing, state-of-the-art lossy snubber used to suppress rectifier diode overvoltage due to the resonance between the diode junction capacitances and the transformer leakage inductance.

Mweene et al. describe a solution for limiting the resonance. FIG. 4 is a highly simplified schematic diagram of a portion of the arrangement of FIG. 3, showing the Mweene et al. scheme. In FIG. 4, elements corresponding to those of FIG. 3 are designated by like reference alphanumerics. Mweene adds a simple voltage clamp circuit designated generally as 410. Voltage clamp circuit 410 includes a capacitor 412 connected at one end to center tap conductor 38. The other end of capacitor 412 is connected by way of a junction node 415 and a resistor 414 to direct output voltage conductor 36. If there is a voltage difference across resistor 414, current will flow. So long as the voltage across capacitor 414 differs from the average direct output voltage, average current will flow in resistor 414. Thus, current will flow in resistor 414 until capacitor 412 assumes a voltage equaling the average direct output voltage appearing across the load (not illustrated in FIG. 4).

Also in FIG. 4, a clamp diode or rectifier 416 is connected "between" conductor 31 and junction node 415. As illustrated, diode 416 is poled to conduct when the instantaneous voltage on conductor 31 relative to conductor 38 is more positive than the voltage across capacitor 412. In operation of the arrangement of FIG. 4, the voltage on conductor 31 relative to conductor 38 tends to rise during the above described resonance. As soon as the voltage on conductor 31 tries to rise above the voltage on capacitor 412, diode 416 conducts, thereby tending to charge capacitor 412. Since the capacitor voltage does not change quickly, the tendency toward a resonant voltage rise on conductor 31 is limited by diode 416 clamping the voltage on conductor 31 to the capacitor voltage. The effect of the offset or forward voltage of the diode devices on the operation has been ignored in the simplified description, as will be understood by those skilled in the art.

The continuous charging of capacitor 412 of clamp circuit 410 of FIG. 4 by recurrent resonances tends to raise its voltage above that of the direct output voltage on conductor 36. Some of the energy represented by this capacitor charge is "returned" or coupled, and adds to, the energy of the direct output voltage. Unfortunately, the coupling results in a component of current flow in resistor 414, which as mentioned tends to maintain the capacitor voltage equal to the direct output voltage. The Mweene et al. clamp circuit of FIG. 4 is simple and effective at clamping, but the current flow in resistor 414 tends to "dissipate" as heat the electrical energy stored in capacitor 412, which may be less efficient than desired. An additional and less obvious disadvantage of the Mweene et al. arrangement is that the clamp voltage is fixed, and must be set to the highest reflected (transformed) input voltage.

It should be noted in FIG. 4 that the voltage rise across conductors 31-38 is due to the voltage rise across T1s caused by the inductor Lt resonating with the diode D2 capacitance, $C_{D2}$. There is a voltage step between nodes B and A which is applied across Lt and $C_{D2}$ (all voltages are referred to the secondary side of the transformer), and D1 is in conduction causing 31 to rise. Since D1 is in conduction T1s rises too; in fact the rise is caused by the Lt-$C_{D2}$ ringing. Mweene clamps this voltage, as otherwise it will ring to nearly twice its normal value. The clamping is by clamp diode 416 but much of the energy associated with the ringing is lost in resistor 414.

Figure 5:
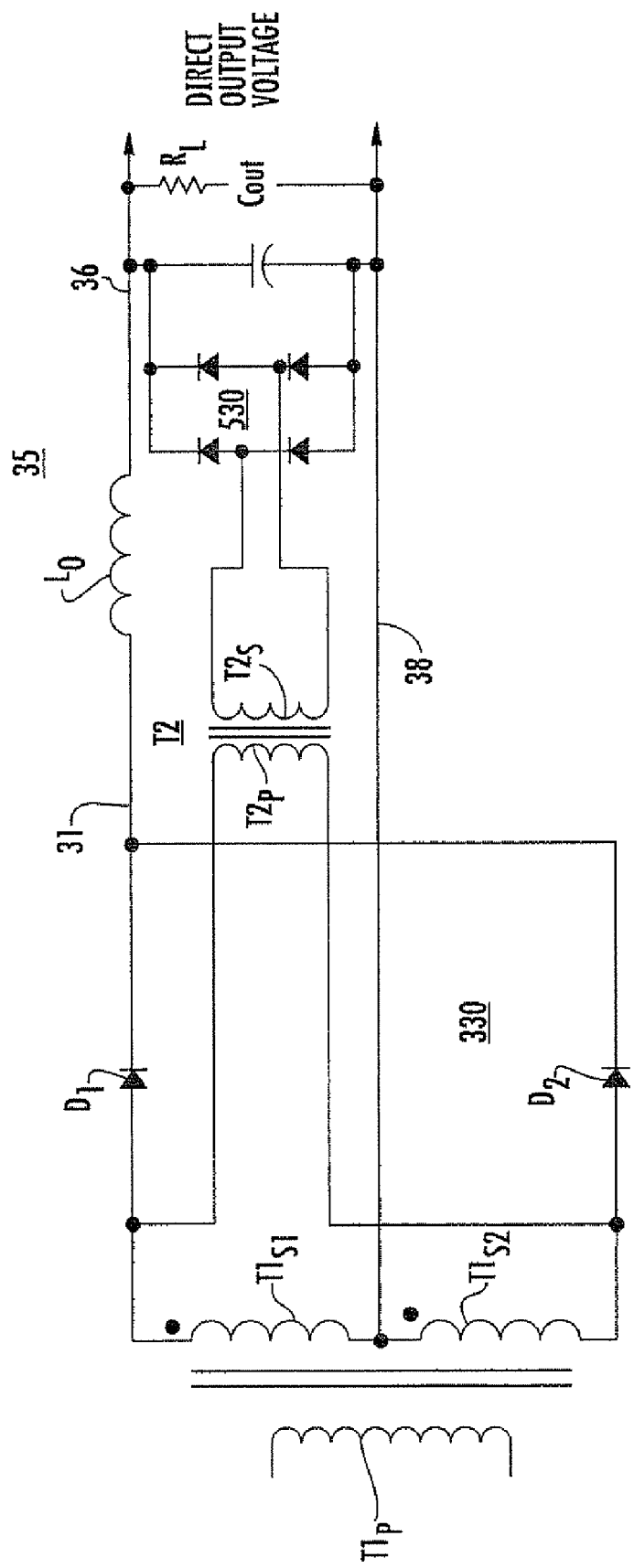
FIG. 5 illustrates a first embodiment of an energy recovery arrangement according to an aspect of the invention in which an energy recovery transformer has its primary winding coupled across a secondary winding of the output transformer of the arrangement of FIG. 1 and in which the recovered energy is coupled to the load side.

FIG. 5 is a simplified schematic diagram of a portion of a dc-to-dc converter, generally similar to the prior-art arrangement of FIG. 4. The arrangement of FIG. 5 is an embodiment according to an aspect of the invention in which clamp energy is returned to the output through a transformer. In FIG. 5, a further transformer T2 includes a primary winding $T2_p$ and a secondary winding $T2_s$. Primary winding $T2_p$ is connected "across" secondary winding $T1_s$. In the arrangement of FIG. 5, when the voltage across transformer T1 secondary winding T1s1 (and by transformer coupling, T1s2) rises due to Lt ringing with D2, the voltage is clamped right at the transformer, which is to say before the conducting diode D1 of full-wave rectifier 330, rather than after. The voltage is clamped by virtue of the transformer T2 and advantageously is nearly lossless since clamping energy is fed directly to the output capacitor Cout through the diode bridge 530. Advantages of the arrangement of FIG. 5 relative to some other arrangements include (a) high theoretical efficiency, since the transfer of energy from the resonance to the output capacitor is nominally lossless, and (b) relative simplicity, since transformer T2 can be implemented is some cases by a small magnetic core using bifilar windings. One notable feature is that the design of the turns ratio of transformer T2 make the clamp voltage greater than the highest reflected voltage across the primary winding T2p. It is important to design the transformer turns ratios such that T2 only conducts while clamping the overvoltage ringing across rectifier D1 (or D2).

Figure 6:
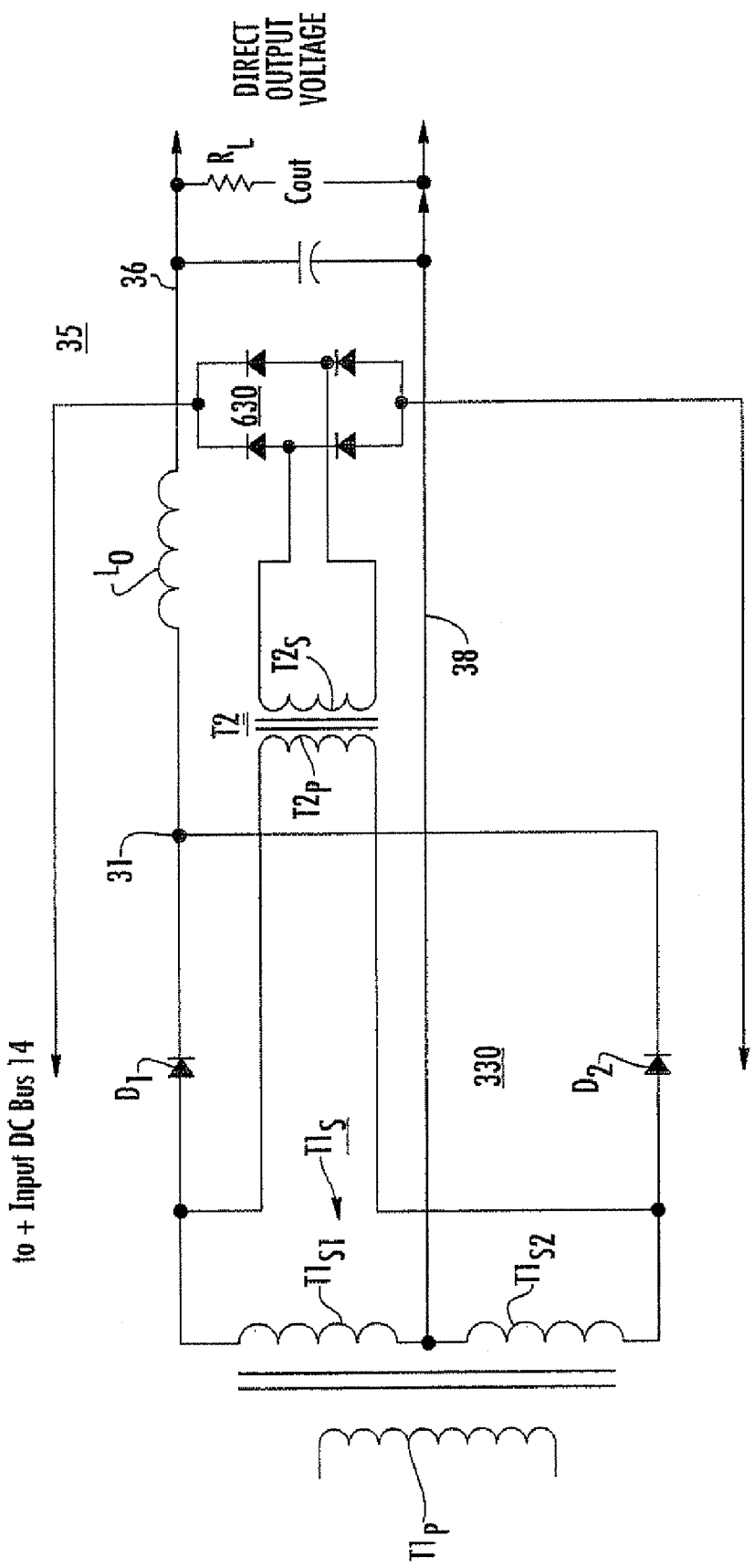
FIG. 6 illustrates a second embodiment of an energy recovery arrangement according to an aspect of the invention in which an energy recovery transformer has its primary winding coupled across a secondary winding of the output transformer of the arrangement of FIG. 1 and in which the recovered energy is coupled to the source side.

The embodiment of FIG. 6 is one in which clamp energy is returned to the input or source through a transformer. Elements of FIG. 6 corresponding to elements of FIG. 1 or 5 are designated by like reference alphanumerics. The arrangement of FIG. 6 operates much like that of FIG. 5, except that the clamp energy is returned to the source by way of buses 14 and 16. As in the arrangement of FIG. 5, the arrangement of FIG. 6 has the advantage of efficiency, since ideally all the clamp voltage is returned to the source. It also has the advantage of simplicity, for the same reasons as for FIG. 5. A salient advantage is that the clamp voltage tracks the applied or input voltage, which is the ideal situation. The clamp voltage tracks the input voltage because the clamp voltage is the input voltage, of course. A minor disadvantage by comparison with some other arrangements is that higher-voltage insulation may in principle be required between the primary and secondary windings of the clamp transformer T2, but since at least some insulation is always used, the voltage rating of the ordinary insulation may be adequate.

Figure 7:
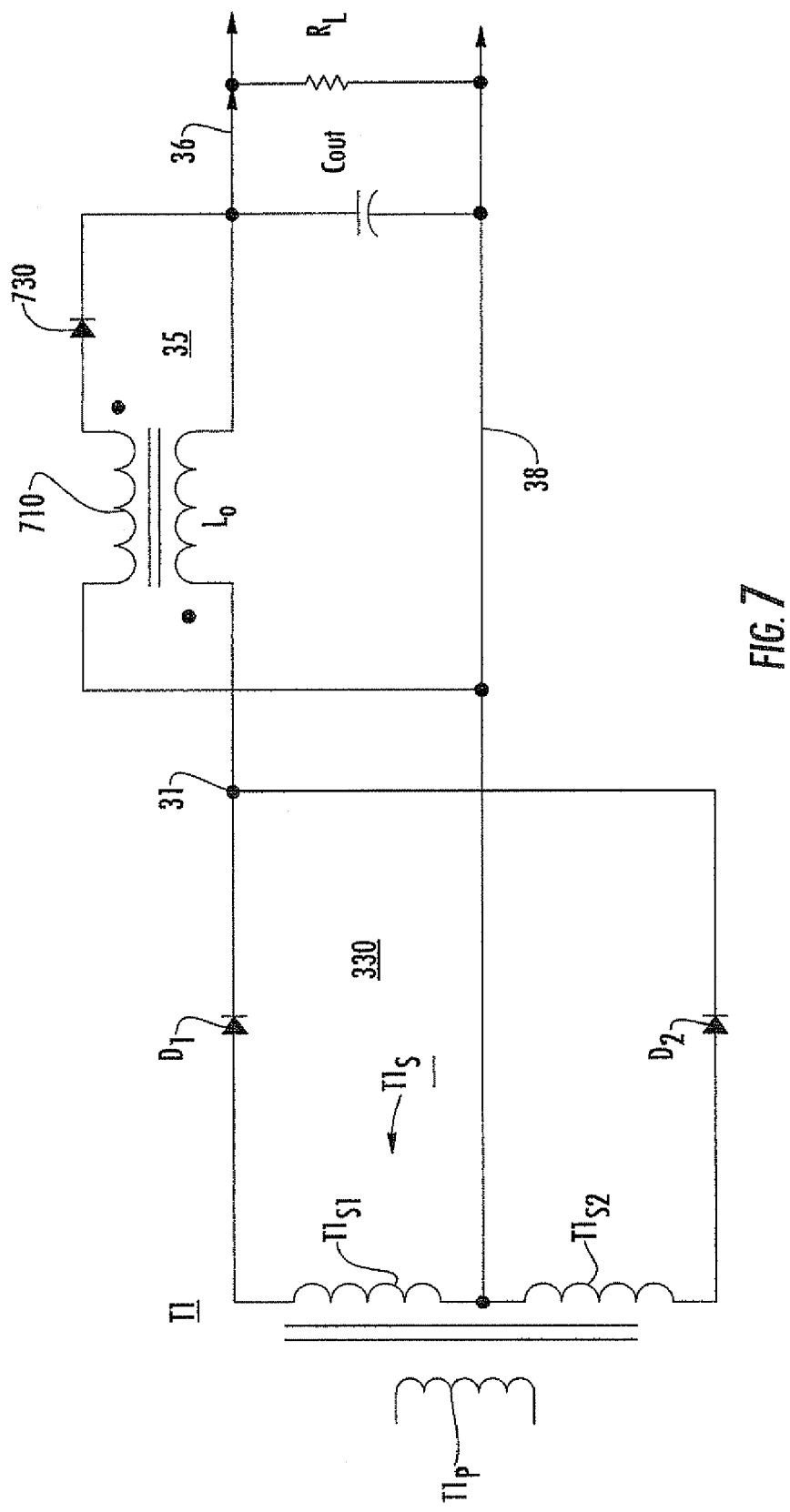
FIG. 7 illustrates a third embodiment of an energy recovery arrangement according to an aspect of the invention in which the energy recovery transformer is merged with a filter inductor, and in which the recovered energy is coupled to the load side.

The embodiment of FIG. 7 is one in which the clamp energy is returned to the output by way of an auxiliary inductor winding. In FIG. 7, elements of FIG. 5 are designated by like reference alphanumerics. In FIG. 7, the resonant voltage rise appears at node 31 relative to conductor 38. Since the voltage across $C_{out}$ does not change quickly, the resonant voltage rise also appears across inductor Lo. A secondary winding designated 710 is magnetically coupled to the main inductor winding Lo, which effectively means that the inductance of Lo is made a part of a transformer including windings Lo and 710. One end of auxiliary winding 710 is connected to conductor 38. The polarization of the windings Lo and 710 is as shown by dot convention, so that the resonant rise at node 31 is coupled through a rectifier or diode 730 to the output capacitor $C_{out}$. Rectifier 730 need not be a full-wave rectifier. The arrangement of FIG. 7 is advantageous in that the clamp energy is ideally fully returned to the output. The arrangement is very simple, requiring only a rectifier and a small added winding on the existing output inductor. As with the arrangement of FIG. 5, the clamp voltage is set or fixed by the output voltage, and therefore must be set to the highest reflected input voltage.

Figure 8:
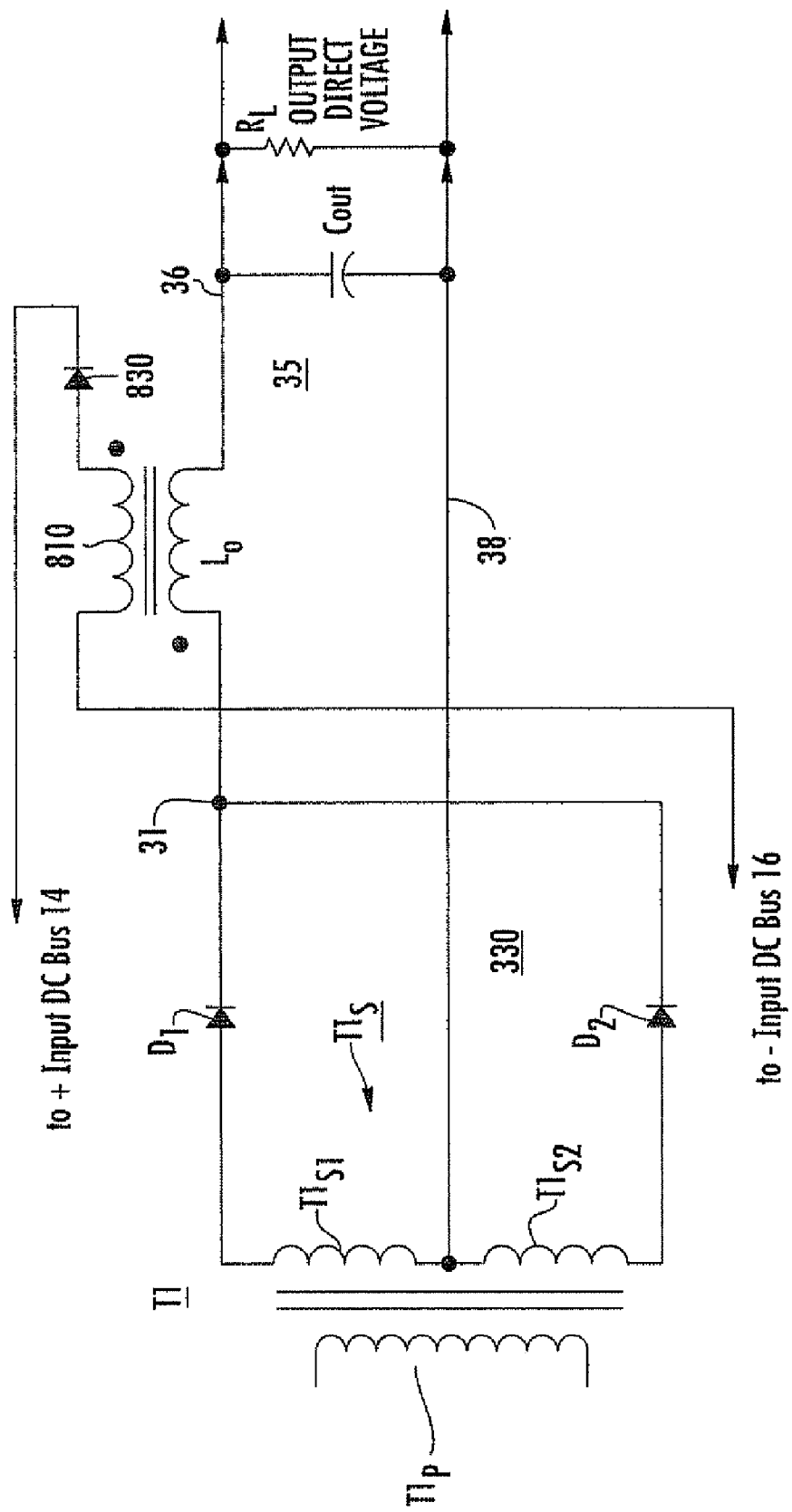
FIG. 8 illustrates a fourth embodiment of an energy recovery arrangement according to an aspect of the invention in which the energy recovery transformer is merged with a filter inductor, and in which the recovered energy is coupled to the source side.

The embodiment of FIG. 8 is one in which the clamp energy is returned to the input or energy source by way of an auxiliary inductor winding. Elements of the arrangement of FIG. 8 corresponding to those of FIG. 6 are designated by like reference alphanumerics. The resonant rise appears at node 31 relative to conductor 38. Since the voltage across capacitor Cout cannot change quickly, the resonant voltage rise is felt across inductor Lo. In FIG. 8, an auxiliary winding 810 is associated with output inductor Lo, and the resonant rise is magnetically coupled to winding 810. Winding 810 is connected at one end to source bus 16, and is connected by a rectifier or diode 830 to source bus 14. The clamp voltage is returned to the energy source by way of buses 14 and 16. Again, ideally all the clamp energy is returned to the energy source. The embodiment is simple, requiring only an auxiliary winding on the output inductor and a rectifier. As with the embodiment of FIG. 6, the clamp voltage is ideal, in that it tracks, or is proportional to, the input voltage, for it is the input voltage. A possible disadvantage corresponding to that described in conjunction with FIG. 6 is that higher-voltage insulation may be required for the auxiliary winding/output inductor pair.

Figure 9:
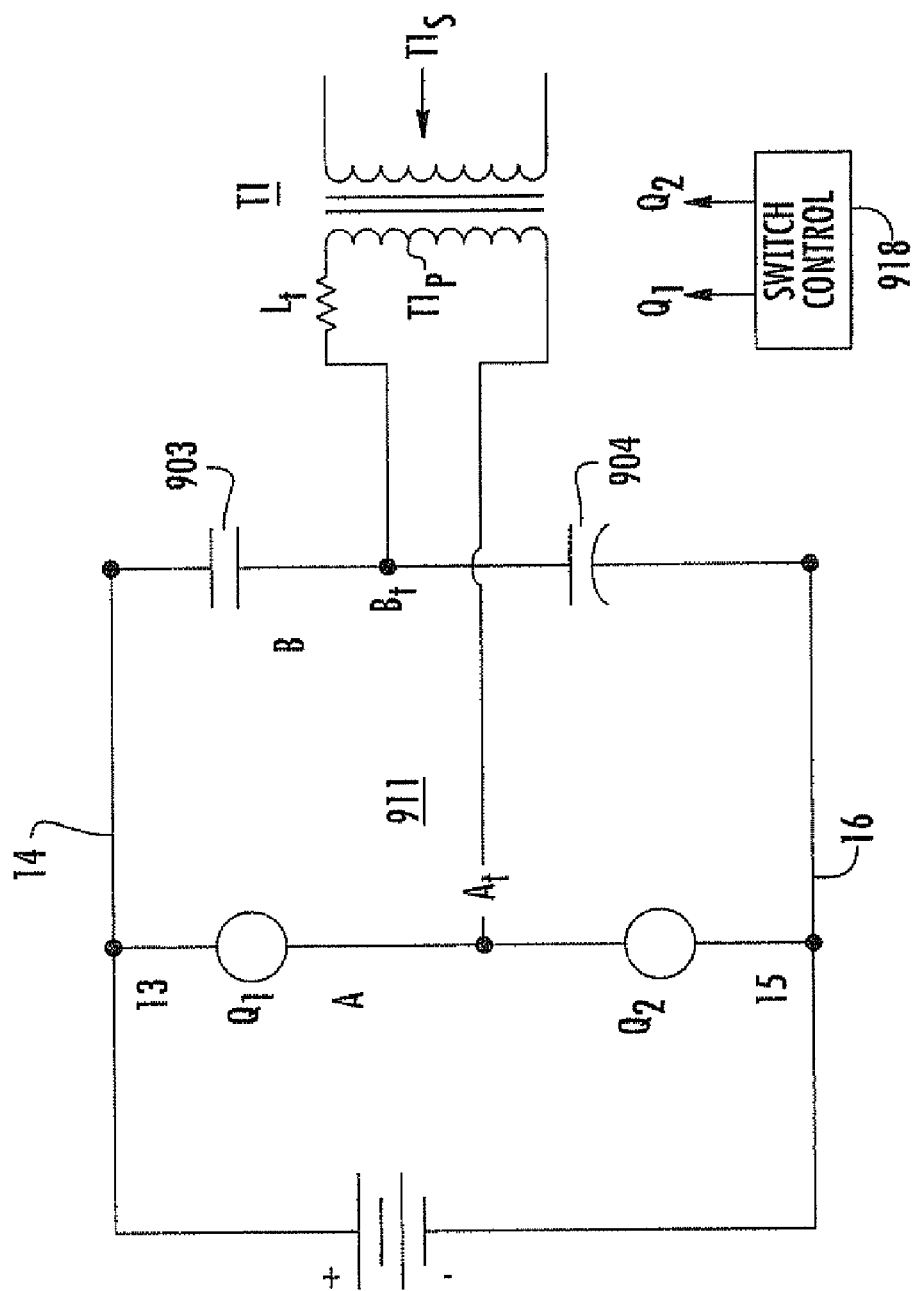
FIG. 9 is a simplified partial schematic diagram illustrating another possible arrangement of the switched bridge which can be used instead of the switched full wave bridge of FIG. 1.

FIG. 9 is a simplified partial schematic diagram illustrating another possible arrangement of a switched bridge 911 which can be used instead of the switched full wave bridges 11. In FIG. 9, elements corresponding to those of FIG. 3 are designated by like reference alphanumerics. The switch bridge arrangement of FIG. 9 differs from that of FIG. 3 in having only two switches, namely switches Q1 and Q2, in half-bridge A. The other half-bridge is not switched, but instead includes capacitors 903 and 904 connected in "series" "across" the buses 14 and 16, with a tap point Bt therebetween. Such half-switched-bridges are known to those skilled in the art, and operate much like a full switched bridge. The switch controller 918 must be adjusted by comparison with the controller 18 to accommodate the different switch configuration.

A dc-to-dc power converter according to an aspect of the invention is for generating a voltage across a load ($R_L$). The power converter comprises a phase-shifted pulse-width-modulated bridge (11). The phase-shifted pulse-width-modulated bridge (11) includes at least first and second controllable switches (Q1, Q2), each controllable switch of which includes a controllable current path (source-to-drain) and a control (gate) input port. The controllable current (source-to-drain) paths of the first (Q1) and second (Q2) controllable switches are connected as a first half-bridge (A) with a first tap (At), a first connection node (13) adjacent the first controllable switch (Q1) and remote from the first tap (At), and a second connection node (15) adjacent the second controllable switch (Q2) and remote from the first tap (At). The first connection node (13) is connected to energizing voltage of a first polarity (+) from a first terminal of a source (12) of direct energizing voltage, and the second connection node (15) is connected to energizing voltage of a second (−) polarity from the source (12) of direct energizing voltage. The phase-shifted pulse-width-modulated bridge further includes third (Q3; 903) and fourth (Q4; 904) devices, each including a current path, with the current paths of the third (Q3; 903) and fourth devices (Q4; 904) being connected as a second half-bridge (B) with a second tap (Bt). The second half-bridge (B) is connected to the energizing voltage of a first polarity (+) from a first terminal of the source (12) of direct energizing voltage, and to the energizing voltage of a second polarity (−) from the source (12) of direct energizing voltage. A phase-shift pulse-width-modulated controller (18; 918) is coupled to at least the control input ports (gates) of the first (Q1) and second (Q2) controllable switches, for switching the controllable switches so that a fixed-frequency alternating voltage appears between the first (At) and second (Bt) taps of the half-bridges with a duty cycle selected to provide a desired converter load ($R_L$) current. An output transformer (T1) including primary ($T1_p$) and secondary ($T1_s$) windings is provided. The primary winding ($T1_p$) of the output transformer (T1) is coupled to the first (At) and second (Bt) taps, so that the alternating voltage is applied to the primary winding ($T1_p$) of the output transformer (T1). A full-wave rectifier (330) is connected to the secondary winding ($T1_s$) of the output transformer (T1), for rectifying secondary winding current flowing under the impetus of the alternating voltage. A filter (35) is coupled to the full-wave rectifier (330) for producing output direct voltage for application to a load ($R_L$), whereby resonances may generate surges which may undesirably result in energy loss. A second transformer (T2) includes a primary winding ($T2_p$) coupled to receive the surges and a secondary winding ($T2_s$) at which transformed surges are produced. A second rectifier (530, 630, 730, 830) is coupled to the secondary winding (T2$_s$) of the second transformer (T2) and to one of the load (R$_L$) and energizing voltages, for rectifying the surges and making the energy of the surges available to the one of the load (R$_L$) and source (12) of energizing voltages. That is, the energy of the surges is returned or coupled to the source (12) or load (R$_L$). In one embodiment, the full-wave rectifier (330) is a bridge rectifier.

The bridge rectifier (330) may comprise a center tap (T1$_{ST}$) on the secondary winding (T1$_s$) of the output transformer (T1) together with first (D1) and second (D2) unidirectional current conductors such as rectifiers or diodes, each coupled to an end of the secondary winding (T1$_e$) remote from the center tap (T1$_{ST}$), and connected to each other. The third (Q3; 903) and fourth (Q4; 904) devices may be third (Q3) and fourth (Q4) controllable switches, respectively, each including a controllable current (source-to-drain) path and a control input port (gate), the controllable current paths of the third (Q3) and fourth (Q4) controllable switches being connected as the second half-bridge (B) with the second tap (Bt), a third connection node (17) adjacent the third controllable switch (Q3) and remote from the second tap (Bt), and a fourth connection node (19) adjacent the fourth controllable switch (Q4) and remote from the second tap (Bt), the third connection node (17) being connected to energizing voltage of the first polarity (+) from the first terminal of the source (12) of direct energizing voltage, and the fourth connection node (19) being connected to energizing voltage of the second polarity (−) from the source (12) of direct energizing voltage. As an alternative, the third (903) and fourth (904) devices may be capacitors.

In another version, the primary winding (T2) of the second transformer (T2) is connected to the secondary winding (T1$_s$) of the output transformer (T1), so as to be energized by the voltage appearing across the secondary winding (T1$_s$) of the output transformer (T1). In this version, the second rectifier (530, 630) is a full-wave rectifier. In yet another version, the primary winding (T2$_p$) of the second transformer (T2) is serially connected between the full-wave rectifier (330) and the load (R$_L$). In this version, the second rectifier is a half-wave rectifier (730; 830).

What is claimed is:

1. A dc-to-dc power converter for generating load voltage, said power converter comprising a phase-shifted pulse-width-modulated bridge;
    said bridge including at least first and second controllable switches, each controllable switch including a controllable current path and a control input port, said controllable current paths of said first and second controllable switches being connected as a first half-bridge with a first tap, a first connection node adjacent said first controllable switch and remote from the first tap, and a second connection node adjacent said second controllable switch and remote from said first tap, said first connection node being connected to energizing voltage of a first polarity from a first terminal of a source of direct energizing voltage, and said second connection node being connected to energizing voltage of a second polarity from said source of direct energizing voltage;
    said bridge further including third and fourth devices, each including a current path, said current paths of said third and fourth devices being connected as a second half-bridge with a second tap, said second half-bridge being connected to said energizing voltage of a first polarity from a first terminal of said source of direct energizing voltage, and to said energizing voltage of a second polarity from said source of direct energizing voltage;
    a phase-shift pulse-width-modulated controller coupled to at least said control input ports of said first and second controllable switches, for switching the controllable switches so that a fixed-frequency alternating voltage appears between said first and second taps of said half-bridges with a duty cycle selected to provide a desired converter load current;
    an output transformer including primary and secondary windings, said primary winding of said output transformer being coupled to said first and second taps, so that said alternating voltage is applied to said primary winding of said output transformer;
    a full-wave rectifier connected to the secondary winding of said output transformer, for rectifying secondary winding current flowing under the impetus of said alternating voltage;
    a filter coupled to said full-wave rectifier for producing output direct voltage for application to a load, whereby resonances may generate surges which may undesirably result in energy loss;
    a second transformer including a primary winding coupled to receive said surges and a secondary winding at which transformed surges are produced;
    a second rectifier coupled to said secondary winding of said second transformer and to one of said load and energizing voltages, for rectifying said surges and making the energy of said surges available to said one of said load and energizing voltages.

2. A converter according to claim 1, wherein said full-wave rectifier is a bridge rectifier.

3. A converter according to claim 1, wherein said full-wave rectifier comprises:
    a center tap on said secondary winding of said output transformer; and
    first and second unidirectional current conductors, each coupled to an end of said secondary winding remote from said center tap, and connected to each other.

4. A converter according to claim 1, wherein said third and fourth devices are third and fourth controllable switches, respectively, each including a controllable current path and a control input port, said controllable current paths of said third and fourth controllable switches being connected as said second half-bridge with said second tap, a third connection node adjacent said third controllable switch and remote from said second tap, and a fourth connection node adjacent said fourth controllable switch and remote from said second tap, said third connection node being connected to energizing voltage of the first polarity from said first terminal of said source of direct energizing voltage, and said fourth connection node being connected to energizing voltage of the second polarity from said source of direct energizing voltage.

5. A converter according to claim 1, wherein said third and fourth devices are capacitors.

6. A converter according to claim 1, wherein:
    said primary winding of said second transformer is connected to said secondary winding of said output transformer, so as to be energized by the voltage appearing across said secondary winding of said output transformer.

7. A converter according to claim 6, wherein said second rectifier is a full-wave rectifier.

8. A converter according to claim 1, wherein:
    said primary winding of said second transformer is serially connected between said full-wave rectifier and said load.

9. A converter according to claim 8, wherein said second rectifier is a half-wave rectifier.

10. A dc-to-dc power converter for generating load voltage, said power converter comprising:
  a phase-shifted pulse-width-modulated bridge including first and second half-bridges;
  a phase-shift pulse-width-modulated controller for causing a fixed-frequency alternating voltage to appear between said first and second half-bridges with a duty cycle selected to provide a desired converter load current;
  an output transformer including primary and secondary windings, said alternating voltage applied to said primary winding of said output transformer;
  a full-wave rectifier connected to the secondary windings of the output transformer, for rectifying secondary winding current flowing under the impetus of said alternating voltage;
  a filter coupled to said full-wave rectifier for producing output direct voltage for application to a load, whereby resonances may generate surges which may undesirably result in energy loss;
  a second transformer including a primary winding coupled to receive said surges and a secondary winding at which transformed surges are produced;
  a second rectifier coupled to said secondary winding of said second transformer and to one of said load and energizing voltages, for rectifying said surges and making the energy of said surges available to said one of said load and said energizing voltages.

11. A converter according to claim 10, wherein said full-wave rectifier is a bridge rectifier.

12. A converter according to claim 10, wherein said full-wave rectifier comprises:
  a center tap on said secondary winding of said output transformer; and
  first and second unidirectional current conductors, each coupled to an end of said secondary winding remote from said center tap, and connected to each other.

13. A converter according to claim 10, wherein:
  said primary winding of said second transformer is connected to said secondary winding of said output transformer, so as to be energized by the voltage appearing across said secondary winding of said output transformer.

14. A converter according to claim 13, wherein said second rectifier is a full-wave rectifier.

15. A converter according to claim 10, wherein:
  said primary winding of said second transformer is serially connected between said full-wave rectifier and said load.

16. A converter according to claim 15, wherein said second rectifier is a half-wave rectifier.

* * * * *